United States Patent Office 3,030,287  
Patented Apr. 17, 1962

3,030,287  
METHOD FOR THE REMOVAL OF SMALL QUANTITIES OF STRONG ELECTROLYTES FROM SOLUTIONS OF WEAK ELECTROLYTES  
Günther Schulz, Ludwigshafen (Rhine), Germany, assignor to Joh. A. Benckiser G.m.b.H. Chemische Fabrik, Ludwigshafen (Rhine), Germany  
No Drawing. Filed Oct. 15, 1958, Ser. No. 767,267  
Claims priority, application Germany Oct. 26, 1957  
8 Claims. (Cl. 204—151)

The use of electro-dialytic cells has been recommended for the removal of salts from solutions having an electrolyte content of more than 2%. These consist each of a cathode- and an anode-space and of alternating compartments formed by cation- and anion-exchange membranes, the even and odd compartments being connected. The solution to be freed of salt and another suitable electrolyte run through the respective compartments, while at the same time a potential difference is applied to the electrodes. Under the influence of the resulting current, the anions are transferred across the anion exchange membrane and the cations across the cation exchange membrane with the result that, in the one group of compartments an accumulation of the electrolyte is obtained, while in the other group a decrease occurs.

For the removal of metal cations only from solutions of salts of weak acids, an arrangement is known in which the individual compartments are bounded only by cation exchange membranes. The salt solution of the weak acid runs through the one group of compartments, and a dilute mineral acid solution, for example sulphuric acid, runs through the other group. When a potential difference is applied to the electrodes, the cations from the salt solution as well as the hydrogen ions from the sulphuric acid solution wander into the respective adjacent compartment in the direction of the cathode, while the anions, to which the cation exchange membrane are impermeable, remain in their chambers. As a result of this cation transfer, sodium sulphate is gradually formed from the sulphuric acid, and the corresponding free weak acid is formed from the salt solution. However, it is not possible to prepare a pure solution of the weak acid in this way, since a state of equilibrium is established.

The state of equilibrium is partly determined by the dissociation constant of the weak acid, and partly by the ratio of the transport number of the hydrogen ion to the cation of the salt which is being used. The higher the dissociation constant of the weak acid and the smaller the ratio of the transport number of the hydrogen ions to that of the cation of the salt, the larger will be the proportion of cations which remain in the free acid solution. It has been found that, in the case of organic acids having a dissociation constant greater than $5 \times 10^{-5}$, and where alkali metal or alkaline earth metal salts of the acids in question have been used, the residue of cations which can no longer be removed represent at least about 1%. This proportion is however still so high, that a subsequent treatment with granular ion-exchanger material in a column is not desirable.

It has now been found that the metal cations in an aqueous solution of a salt of a weak acid can be replaced almost completely by hydrogen ions by first adding to the solution a small quantity of an organic solvent which is miscible with water and with the dissolved substance, or of an organic compound which has been rendered soluble, for example by using solubilising agents. The aqueous solution of the salt so treated is then electrically dialysed in a known manner, in a multi-compartment cell with cation exchange membranes.

The expression "organic solvents" means neutral organic liquids which do not react undesirably with the treated salt, especially those of alcohol, aldehyde or ketone function such as acetone, methyl alcohol, ethyl alcohol, propyl alcohol, methyl ethyl ketone, glycol, and glycerine. Those boiling below 100° C. are preferred. The required effect, namely the more complete substitution of the cations of the organic salt by hydrogen ions, is already obtained with quantities as small as 2 to 3% of solvent, calculated on the total quantity of solution.

In operation, some of the current used is converted into heat, and it can readily be arranged for the solutions to flow from the cell at a temperature which is high enough to boil out much of the solvent used where this is relatively volatile; the condensed vapour can be returned again to the process without further separation from water.

In a similar manner weak bases can be separated from strong bases. In this instance it is only necessary to substitute anion exchange membranes for the cation exchange membranes. Similarly, strongly dissociating salts can be removed from solutions of weak electrolytes according to the present invention, by subdividing the cell into individual compartments alternately by means of cation- and anion-exchange membranes.

The following examples illustrate how the invention may be carried into effect, in each case a corresponding process not using the invention being described by way of comparison; the percentages are by weight, except where otherwise stated.

Example 1

A solution of crude citric acid was free of cations in an electro-dialytic cell, which was subdivided into 11 compartments by 10 cation-exchange membranes, with an effective membrane surface of 120 cm.$^2$. The crude citric acid used had initially a total residue on ignition of 1.4%. The cations to be removed were essentially calcium, sodium, potassium, aluminium and iron ions. The solution of citric acid ran through the second, fourth, sixth, eighth and tenth compartments of the system, while a 1.1% sulphuric acid solution was fed through the first, third, fifth, seventh, ninth and eleventh compartments of the apparatus. There was a potential difference of about 16 v. between the electrodes, corresponding to a current of 1.8 to 2.0 amps. The velocity of flow through the chambers was regulated at 11.5 cm.$^3$/minute for the citric acid, and at 3.5 cm.$^3$/minute for the sulphuric acid. The citric acid leaving the apparatus has a residue of 0.44% on ignition. A reduction in the velocity of flow of the citric acid to 4 cm.$^3$/minute, caused only a slight decrease in the residue on ignition, to 0.42%.

A further sample of the citric acid solution was now treated electro-dialytically in the same apparatus, but it was first treated with 8 vol. percent of acetone before being fed into the cell. The velocity of flow of the sulphuric acid was maintained as before, but that of the crude citric acid was raised to 12 cm.$^3$/minute. The outflowing purified citric acid, after evaporation of the acetone, had a residue on ignition of 0.19%.

Example 2

In an apparatus as described in Example 1, a sodium tartrate solution was converted to tartaric acid. In this case however, the sodium tartrate solution did not run through the compartments only once, but was continuously pumped round by means of a small laboratory pump. The dilute sulphuric acid solution in the other group of compartments ran through the apparatus only once, as in Example 1, at a velocity of 4 cm.$^3$/minute.

In this test a starting quantity of 800 cm.$^3$ of a 20% sodium tartrate solution was used. After running for 10.5 hours, equilibrium was reached. The tartaric acid solution formed from the sodium tartrate solution had a residue on ignition of 0.86%.

The test just described was repeated, but this time the tartaric acid-sodium tartrate solution circulating in the cell had added to it 30 cm.³ of methyl alcohol. This addition was made after running for 9 hours, that is, shortly before the state of equilibrium was reached. The quantity of methyl alcohol added corresponded to 3.75 vol. percent. After running for a further two hours, the experiment was discontinued, the methyl alcohol was evaporated and the residue on ignition was determined as 0.27%.

*Example 3*

An aqueous solution of piperidine was electro-dialysed in an apparatus which differs from the one described in Examples 1 and 2, only in that the cation exchange membranes were substituted by anion exchange membranes. The starting solution, of about 14% concentration, was contaminated with 2.8% chlorine ions, and as in Example 1, ran through the even compartments of the electrolysis cell. A 3.5% sodium hydroxide solution was passed through the odd compartments. After 4 hours circulation of the piperidine solution through the apparatus, the chlorine content of the solution had dropped to 1.3% and did not change any further.

On repeating the test, adding however 14 vol. percent of ethyl alcohol to the piperidine solution under other-equal conditions, a piperidine solution was obtained after 4 hours electro-dialysis, which after evaporation of the ethyl alcohol contained only 0.22% chlorine ions.

In each of the foregoing examples the solvent stipulated in either of the other examples could have been used.

What is claimed as new and desired to be secured by Letters Patent is:

1. In a method of removing minor quantities of strong electrolytes from an aqueous solution of a weak electrolyte by subjecting said aqueous solution to electrodialysis in an electrodialytic cell including at least one ion exchange membrane, the improvement which comprises adding a minor amount of a water miscible neutral organic liquid which is miscible with said aqueous solution and non-reactable with said electrolytes before subjecting said aqueous solution to electrodialysis.

2. In a method of removing minor quantities of strong electrolytes from an aqueous solution of a weak electrolyte by subjecting said aqueous solution to electrodialysis in an electrodialytic cell including at least one ion exchange membrane, the improvement which comprises adding a minor amount of a water miscible neutral organic liquid which is miscible with said aqueous solution and non-reactable with said electrolytes and being selected from the group consisting of acetone, methyl ethyl ketone, methanol, ethanol, propanol, glycol and glycerine before subjecting said aqueous solution to electrodialysis.

3. In a method of removing minor quantities of strong electrolytes from an aqueous solution of a weak electrolyte by subjecting said aqueous solution to electrodialysis in an electrodialytic cell including at least one ion exchange membrane, the improvement which comprises adding a minor amount of a water miscible neutral organic liquid which is miscible with said aqueous solution and non-reactable with said electrolytes and having a boiling point below 100° C. before subjecting said aqueous solution to electrodialysis.

4. In a method of removing minor quantities of strong electrolytes from an aqueous solution of a weak electrolyte by subjecting said aqueous solution to electrodialysis in an electrodialytic cell including at least one ion exchange membrane, the improvement which comprises adding a minor amount of a water miscible neutral organic liquid which is miscible with said aqueous solution and non-reactable with said electrolytes and having a boiling point below 100° C. before subjecting said aqueous solution to electrodialysis; and heating the thus dialyzed solution to a temperature sufficiently high to evaporate said organic liquid therefrom, thereby separating said organic liquid from the thus dialyzed aqueous solution.

5. In a method of removing minor quantities of strong electrolytes from an aqueous solution of a weak electrolyte by subjecting said aqueous solution to electrodialysis in an electrodialytic cell including at least one ion exchange membrane, the improvement which comprises adding a minor amount of a water miscible neutral organic liquid which is miscible with said aqueous solution and non-reactable with said electrolytes and having a boiling point below 100° C. before subjecting said aqueous solution to electrodialysis; passing a current through the thus dialyzed solution to heat the same to a temperature sufficiently high to evaporate said organic liquid therefrom; condensing the thus formed vapors of said organic liquid; and adding the thus obtained condensate to additional aqueous soltion to be subjected to electrodialysis.

6. In a method of electrodialyzing an aqueous solution of crude citric acid in an electrolytic cell including at least one ion exchange membrane, the improvement which comprises adding about 8% of acetone to said aqueous solution before subjecting the same to electrodialysis.

7. In a method of electrodialyzing an aqueous solution of sodium tartrate in an electrolytic cell including at least one ion exchange membrane, the improvement which comprises adding about 4% by volume of methanol to said aqueous solution before subjecting the same to electrodialysis.

8. In a method of electrodialyzing an aqueous solution of piperidine in an electrolytic cell including at least one ion exchange membrane, the improvement which comprises adding about 14% by volume of ethanol to said aqueous solution before subjecting the same to electrodialysis.

References Cited in the file of this patent

UNITED STATES PATENTS

| | | |
|---|---|---|
| 2,044,261 | Southgate | June 16, 1936 |
| 2,671,055 | Aten et al. | Mar. 2, 1954 |
| 2,689,826 | Kollsman | Sept. 21, 1954 |